(12) United States Patent
Braithwaite

(10) Patent No.: US 9,042,838 B2
(45) Date of Patent: May 26, 2015

(54) TRANSMIT LEAKAGE CANCELLATION IN A WIDE BANDWIDTH DISTRIBUTED ANTENNA SYSTEM

(75) Inventor: Richard Neil Braithwaite, Orange, CA (US)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 13/214,573

(22) Filed: Aug. 22, 2011

(65) Prior Publication Data

US 2012/0052892 A1 Mar. 1, 2012

Related U.S. Application Data

(60) Provisional application No. 61/377,065, filed on Aug. 25, 2010.

(51) Int. Cl.
 *H04B 17/00* (2006.01)
 *H04B 1/04* (2006.01)
 *H04B 15/00* (2006.01)

(52) U.S. Cl.
 CPC ..................................... *H04B 1/525* (2013.01)

(58) Field of Classification Search
 CPC ........................................................ H04B 1/525
 USPC .................... 455/76.13, 114.2, 501, 67.13
 See application file for complete search history.

(56) References Cited

U.S. PATENT DOCUMENTS

| 6,915,112 | B1* | 7/2005 | Sutton et al. | 455/67.13 |
| 2004/0192232 | A1* | 9/2004 | Szopko et al. | 455/103 |
| 2007/0018723 | A1* | 1/2007 | Arbab et al. | 330/151 |
| 2008/0192807 | A1* | 8/2008 | Castaneda et al. | 375/136 |
| 2009/0170438 | A1* | 7/2009 | Gebara et al. | 455/63.1 |
| 2010/0029197 | A1* | 2/2010 | Judd et al. | 455/11.1 |

* cited by examiner

*Primary Examiner* — Ping Hsieh
*Assistant Examiner* — Xin Jia
(74) *Attorney, Agent, or Firm* — Schwegman Lundberg & Woessner, P.A.

(57) ABSTRACT

A system and methods for cancelling transmission leakage signals in a wide bandwidth Distributed Antenna System ("DAS") having remote units is disclosed. An internal cancellation circuit within the remote unit is employed to reduce the transmitted leakage signals by generating a cancellation signal. This cancellation signal is added to the received signal to cancel the transmission leakage signal in the receiving signal path. A pilot signal generation circuit is employed to optimize the cancellation circuit operating parameters. The frequency of the pilot signal is swept over a range to determine the pilot frequency having the highest electromagnetic coupling. The amplitude and phase of the cancellation signal is then optimized to minimize the level of transmission leakage in the receiving transmission path.

6 Claims, 6 Drawing Sheets

TRANSMIT LEAKAGE CANCELLATION IN A WIDE BANDWIDTH DISTRIBUTED ANTENNA SYSTEM

RELATED APPLICATION INFORMATION

The present application claims priority under 35 U.S.C. Section 119(e) to U.S. Provisional Patent Application Ser. No. 61/377,065 filed Aug. 25, 2010, the disclosure of which is incorporated herein by reference in its entirety.

BACKGROUND OF THE INVENTION

1. Field of the Invention

The present invention relates generally to methods and systems related to wireless telephony. More particularly, the invention relates to transmission leakage cancellation systems and methods for remote units.

2. Description of the Prior Art and Related Background Information

Modern wireless telephone systems often employ Distributed Antenna Systems ("DAS") throughout a region having multiple remote units. Each of the remote units typically has a transmission and receiving antenna which are physically separated in order to isolate the antennas. In other applications, the antennas may not be sufficiently isolated such that the signal transmitted from the transmitting antenna appears on the receiving antenna as a transmission leakage signal. This transmission leakage signal detrimentally affects the performance of remote units.

Accordingly, a need exists to improve the performance of remote units.

SUMMARY OF THE INVENTION

In a first aspect the present invention provides a distributed antenna system ("DAS") comprising a plurality of wireless remote units coupled to one or more base stations. The wireless remote units comprise a first signal path for providing a transmission signal, a transmitting antenna for outputting the transmission signal, a receiving antenna for receiving a received signal, a second signal path for providing the received signal, and a cancellation circuit coupled to the first signal path and the second signal path, where the cancellation circuit includes means for providing a cancellation signal to the second signal path for substantially cancelling a transmission leakage signal in the received signal.

In a preferred embodiment, the cancellation circuit preferably comprises a delay circuit configured for matching a delay associated with the first signal path, the transmitting antenna, the receiving antenna, and the second signal path. The means for providing a cancellation signal preferably comprises a vector modulator configured for substantially cancelling a transmission leakage signal in the received signal by adjusting the amplitude and phase of the cancellation signal. The cancellation circuit preferably further comprises a bandpass filter having a cancellation bandwidth substantially less than the bandwidth of the DAS. The cancellation bandwidth preferably has a bandwidth in the range of approximately 60 Megahertz to approximately 200 Megahertz.

In another aspect the present invention provides a distributed antenna system ("DAS") including a plurality of wireless remote units. Each wireless remote unit comprising a first signal path for providing a transmission signal, a transmitting antenna for outputting the transmission signal, a receiving antenna for receiving a received signal, a second signal path for providing the received signal, a pilot signal generation circuit coupled to the first signal path and the second signal path, where the pilot signal generation circuit is configured for generating a pilot signal in the first signal path, and a detector for detecting the pilot signal in the second signal path. The pilot signal generation circuit comprises a first bandpass filter having a first bandwidth. Each wireless remote unit further comprises a cancellation circuit coupled to the first signal path and the second signal path, where the cancellation circuit is controlled responsive to the detected pilot signal for providing a cancellation signal to the second signal path for substantially cancelling a transmission leakage signal in the received signal.

In a preferred embodiment the wireless remote units preferably further comprise a first amplifier in the first signal path and a second amplifier in the second signal path. The pilot signal generation circuit is preferably coupled to the input of the first amplifier and is coupled to the output of the second amplifier and the cancellation circuit is coupled to the output of the first amplifier and the input of the second amplifier. The cancellation circuit preferably further comprises a cancellation circuit bandpass filter coupled to the first signal path, a delay circuit coupled to the bandpass filter, and a vector modulator coupled to the delay circuit, where the vector modulator is configured for substantially cancelling a transmission leakage signal in the received signal by adjusting the amplitude and phase of the cancellation signal, and an additive coupler coupled to the output of the vector modulator and the second signal path. The pilot signal generation circuit preferably comprises a controller configured for controlling the vector modulator based on the detected pilot signal in the second signal path. The pilot signal generation circuit preferably further comprises a limiter configured for limiting overall gain of the pilot signal generation circuit, the first amplifier, the cancellation circuit, and the second amplifier, and a phase shifter configured for shifting the frequency of the pilot signal. The pilot signal generation circuit preferably further comprises an absorptive switch configured for disabling the pilot signal generation circuit.

The wireless remote units preferably further comprise a second pilot signal generation circuit configured for providing a second pilot signal in the first signal path. The second pilot signal generation circuit preferably comprises a second bandpass filter having a second bandwidth differing from the first bandwidth of the first bandpass filter. The second pilot signal generation circuit is preferably coupled to the input of the first amplifier and is coupled to the output of the second amplifier The wireless remote units further comprise a second detector for detecting the second pilot signal in the second signal path and a second cancellation circuit configured for providing a second cancellation signal to the second signal path, where the second cancellation circuit is coupled to the output of the first amplifier and the input of the second amplifier. The pilot signal generation circuit preferably further comprises a limiter configured for limiting gain of the pilot signal generation circuit, the first amplifier, the cancellation circuit, and the second amplifier, and a phase shifter configured for shifting the phase of the pilot signal. The second pilot signal generation circuit preferably further comprises a second limiter configured for limiting gain of the second pilot signal generation circuit, the first amplifier, the second cancellation circuit, and the second amplifier, and a second phase shifter configured for shifting the phase of the second pilot signal. The wireless remote units preferably further comprises a second cancellation circuit configured for providing a second cancellation signal to the second signal path, where the second cancellation circuit is coupled to the output of the first amplifier and the input of the second amplifier. The pilot signal generation circuit is preferably further configured for generating a second pilot signal in the first signal path.

In another aspect, the present invention provides a method for transmission leakage cancellation in a wireless remote unit in a distributed antenna system ("DAS"), the remote unit having a first signal path coupled to a transmission antenna and a second signal path coupled to a receiving antenna. The method comprises generating a pilot signal, providing the pilot signal to a transmission antenna, generating a cancellation signal, receiving the received signal having a transmission leakage signal in a receiving antenna, providing the received signal to a second signal path, and cancelling the transmission leakage signal by adding the cancellation signal with the received signal.

In a preferred embodiment the method further comprises filtering the pilot signal with a bandpass filter having a first bandwidth and filtering the cancellation signal with a second bandpass filter having the first bandwidth. Cancelling the transmission leakage signal preferably comprises detecting a residual pilot signal after the cancellation signal has been added to the received signal, and adjusting an amplitude and phase of the cancellation signal based on the detected residual pilot signal. The method preferably further comprises shifting the frequency of the pilot signal to find a pilot frequency with a highest RF coupling, and adjusting the amplitude and phase of the cancellation signal to minimize the detected residual pilot signal. Adjusting the amplitude and phase of the cancellation signal preferably further comprises performing a two-dimensional descent-based search. Adjusting the amplitude and phase of the cancellation signal preferably further comprises determining the optimized amplitude and phase parameters.

Further features and aspects of the invention are set out in the following detailed description.

DETAILED DESCRIPTION OF THE INVENTION

Embodiments of the present invention provide systems and methods for cancelling transmission leakage signals in remote units in a Distributed Antenna System ("DAS") in which the receiving antenna is electromagnetically coupled to the transmitting antenna. An internal cancellation circuit within the remote unit is employed to reduce the transmitted leakage signals. The cancellation circuit is coupled to the transmission signal path and comprises a bandpass filter, a delay circuit, and a vector modulator to generate a cancellation signal. This cancellation signal is then added to the received signal to cancel the transmission leakage signal in the receiving signal path. A pilot signal generation circuit may be used to optimize the cancellation circuit operating parameters. The pilot signal generation circuit introduces a pilot signal in the transmission signal path, which is then transmitted and received by the receiving antenna. The pilot signal generation circuit comprises one or more bandpass filters, a detector and controller unit, a limiter, a phase shifter, and an absorptive switch. A detector and controller unit in the pilot signal generation circuit measures the residual pilot signal, and then controls the phase shifter to sweep the frequency of the pilot signal over a range to determine the frequency having the highest electromagnetic coupling. The detector and controller unit controls the amplitude and phase of the cancellation signal to minimize the level of transmission leakage in the receiving signal path.

Figure 1:
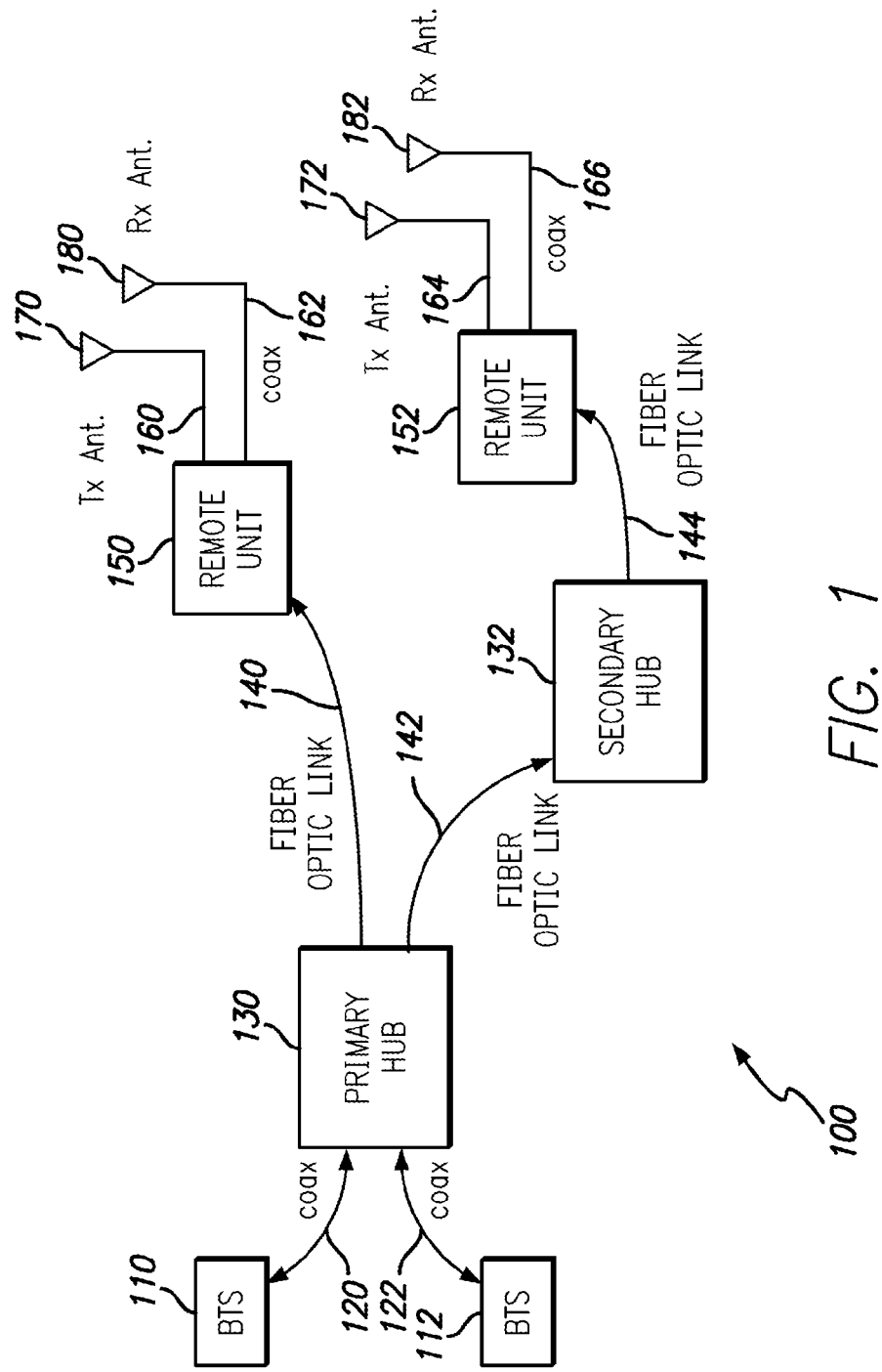
FIG. 1 is a schematic drawing of a Distributed Antenna System ("DAS") having multiple remote units.

Wide bandwidth DAS systems are available that distribute signals along separate transmit and receive pathways. An exemplary wide bandwidth DAS 100 is shown in FIG. 1. The transmit signal from a base station (BTS) such as BTS 110 and 112 is distributed throughout a building, using a primary hub 130, to several remote units such as remote units 150 and 152 that each have a small coverage area. BTS 110 and 112 may be coupled to the primary hub 130 using coaxial cables 120 and 122, and the primary hub 130 may be coupled to the remote units 150 and 152 and a secondary hub 132 using fiber optic links 140, 142, and 144 for example. Remote unit 150 may be coupled to the transmission antenna 170 and the receiving antenna 180 using coaxial cables 160 and 162 in an embodiment. Likewise, remote unit 152 is coupled to the transmission antenna 172 and the receiving antenna 182 using coaxial cables 164 and 166. The receive signal going to BTS 110 and 112 is obtained by combining signals from the remote units 150 and 152 using the primary hub 130. The coverage of the entire building is ensured by installing a sufficient number of remote units placed throughout the structure. A secondary hub 132 may be needed to further distribute the signals if the DAS network contains a large number of remote units.

Figure 2:
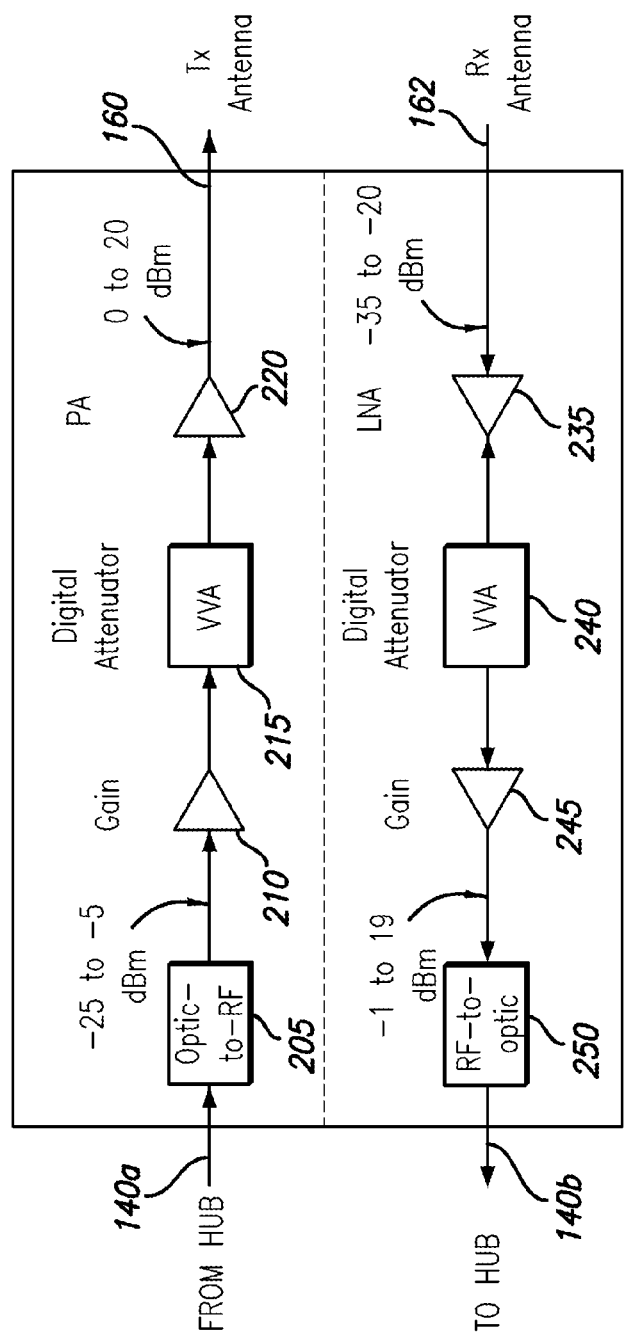
FIG. 2 is a schematic drawing of an exemplary remote unit depicted in FIG. 1.

Consider an exemplary remote unit as shown in FIG. 2 which amplifies both the transmit and receive signals. Embodiments of the remote units described herein such as remote unit 150 may have a first signal path for providing a transmission signal and a second signal path for providing a received signal. The transmission signal path (i.e., the first signal path) comprises an optical-to-RF ("Radio Frequency") converter 205 which receives signals from hub 130 through fiber optic link 140a. The RF signal is then amplified by amplifier 210. The amplified signal is then fed into variable voltage attenuator ("VVA") 215. The output of VVA 215 is coupled to the input of power amplifier ("PA") 220 which provides the transmission signal to the transmission antenna using coaxial cable 160. The receiving signal path (i.e., the second signal path) comprises a low noise amplifier ("LNA") 235 which receives signals from the receiving antenna via coaxial cable 162. The output of LNA 235 is coupled to VVA 240, and is then amplified by amplifier 245. The output of amplifier 245 is converted into optical signals by RF-to-optical converter 250 which transmits the received signals to the hub 130 using fiber optic link 140b.

The remote unit employs VVAs 215 and 240 on both RF paths to compensate for the level shifting done within the fiber optic links 140a and 140b which connect the remote unit 150 and hub 130. There are no duplex filters to separate the transmit and receive bands within the remote unit 150 or hub 130. The isolation between the transmit and receive path is achieved by separating the transmit ("Tx") 170 and receive ("Rx") 180 antennas. The level of isolation is assumed to be 40 dB.

Consider the case where the isolation between the Tx and Rx antennas is not sufficient. In this scenario, part of the Tx signal can appear in the Rx signal path due to coupling between the Tx and Rx antennas. This interference is not seen by the basestation such as BTS 110 and 112 because the interference is rejected by the BTS's duplexer. However, the energy of the Tx signal on the Rx path detrimentally consumes the dynamic range of both the LNA 235 and the fiber optic link 140b. In other words, the leaked Tx signal acts as a blocker within the Rx chain.

Figure 3:
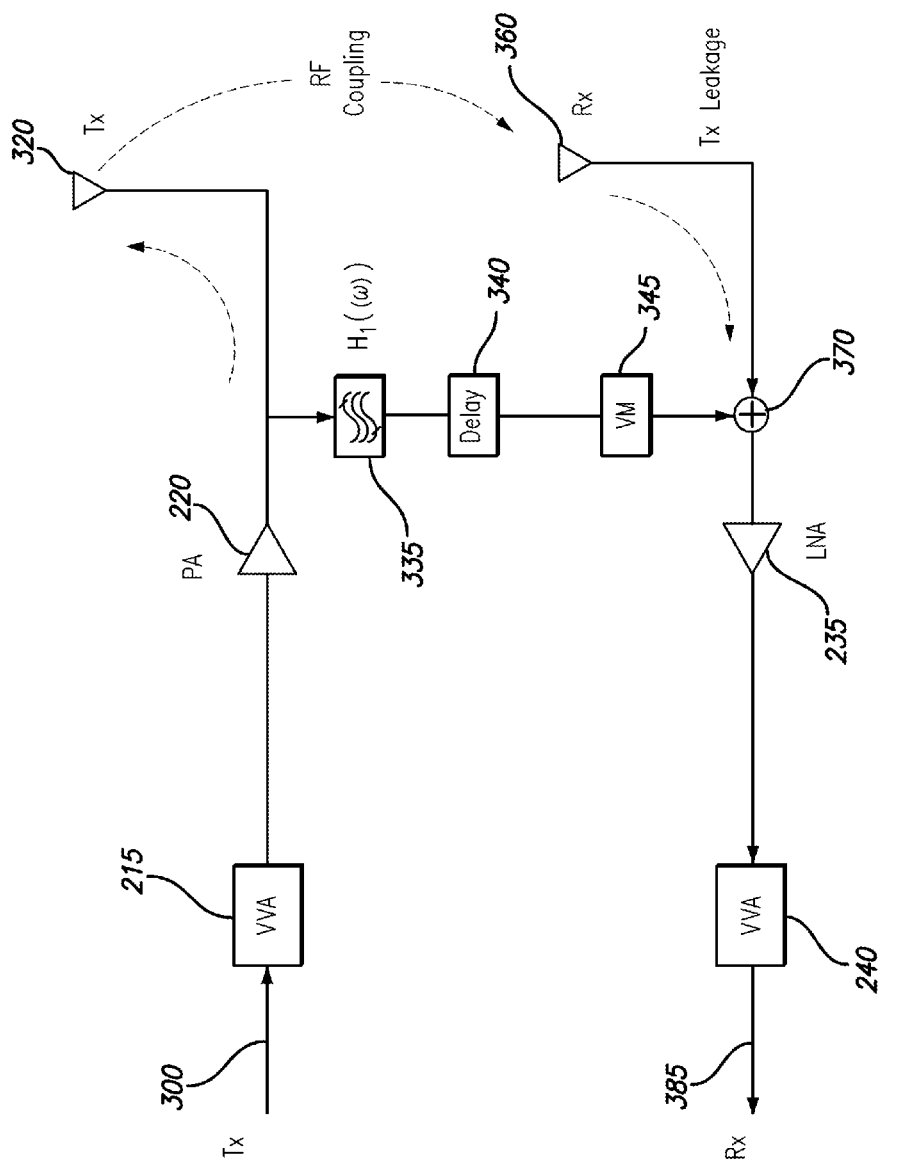
FIG. 3 is a schematic drawing of a cancellation circuit employed by a remote unit in an improved DAS in accordance with the present invention.

It is therefore desirable to cancel the Tx signal coupled into the Rx path. Cancellation is performed over a narrow bandwidth compared to the wide bandwidth of the DAS system. FIG. 3 depicts an exemplary circuit employed in the remote units (150, 152) in an improved DAS in accordance with the present invention, illustrating the transmission signal path, received signal path, and a cancellation circuit. FIG. 3 also illustrates the RF coupling between the Tx antenna 320 and the Rx antenna 360.

Cancellation of the Tx leakage is achieved using an internal feed-through cancellation circuit path from the Tx and Rx signal paths controlled by adjustable gain (amplitude and phase). The Tx signal path (i.e., the first signal path) comprises a VVA 215 which receives the transmission signal 300 from the output of an amplifier 210, a PA 220, and a Tx antenna 320. The Rx signal path (i.e., the second signal path) comprises an Rx antenna 360, an additive coupler 370 which sums the received signal with a cancellation signal discussed below. The resultant signal is then fed to LNA 235 and then to VVA 240. The received signal 385 is sent to the input of amplifier 245.

The internal cancellation circuit path is coupled to the output of Tx PA 220 and comprises a bandpass filter 335, a delay circuit 340, and a vector modulator ("VM") 345 to generate a cancellation signal. The cancellation signal is fed to an input of the additive coupler 370 which adds the received signal with the cancellation signal. The sum of the signals is amplified by Rx LNA 235. A bandpass filter 335, having a frequency response denoted by $H_1(\omega)$, is used to limit the cancellation bandwidth ("BW"). In general, a cancellation bandwidth of 60 MHz to 200 MHz could be expected. A delay circuit 340 is provided within the cancellation path so that the circuit delay matches the delay associated with the path formed by the feedlines connecting to the antennas and the RF coupling between antennas. A VM 345 is used to adjust the amplitude and phase of the cancellation signal so that the Tx leakage within the cancellation BW is cancelled as much as possible.

Figure 4:
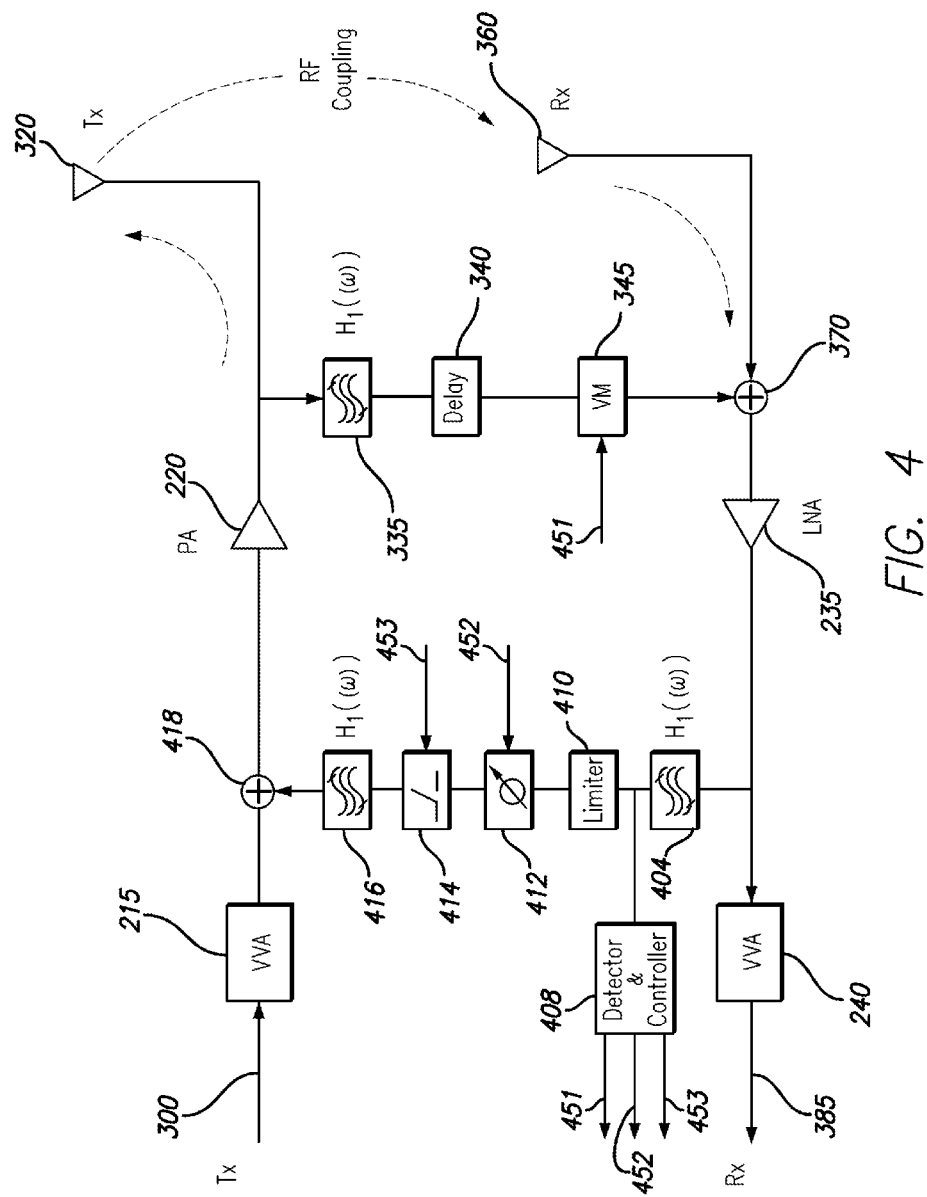
FIG. 4 is a schematic drawing of a remote unit having a pilot signal generation circuit and a cancellation circuit.

It is desirable to tune the operating parameters of the VM automatically. FIG. 4 illustrates an embodiment in which a pilot signal generation circuit is employed that first generates a pilot signal, and then measures the power of the residual pilot signal after cancellation. The Tx signal path (i.e., the first signal path) comprises a VVA 215 which receives the transmission signal 300 from the output of an amplifier 210, an additive coupler 418, a PA 220, and a Tx antenna 320. The Rx signal path (i.e., the second signal path) comprises an Rx antenna 360, an additive coupler 370, a LNA 235, and a VVA 240 which generates a received signal 385 that is sent to the input of amplifier 245. The pilot signal generation circuit comprises a bandpass filter 404 coupled to the output of the LNA 235, a detector and controller unit 408, a limiter 410, a phase shifter 412, an absorptive switch 414, and a bandpass filter 416. The output of the bandpass filter 416 is fed into additive coupler 418 which adds the pilot signal with the signal generated by VVA 215. In this non limiting example, the detector and controller unit 408 performs the functions of detecting and controlling, however, it shall be understood that these functions may be performed by two or more separate devices in an embodiment.

Nonlinear positive feedback through the limiter 410 results in a bounded oscillation if two conditions are met. The first condition, referred to herein as the "amplitude condition," requires that the feedback loop gain of the pilot signal generation circuit (which includes limiter 410), the PA 220, the parallel paths of the cancellation circuit and RF coupling between antennas 320 and 360, and the LNA 235 has a gain of unity. If the gain of the remainder of the loop is high enough that generated signal is clipped by the limiter, then the amplitude condition is met.

The second condition, referred to herein as the "phase condition," requires that the phase around the feedback loop must be zero: that is, $$2 \cdot \pi \cdot n = \omega_{pilot} \cdot T_{loop} + \phi_0$$

where n is an integer, $\omega_{pilot}$ is the pilot frequency, $T_{loop}$ is the delay around the feedback loop, and $\phi_0$ is a phase shift which can be adjusted using the phase shifter 412 in the pilot signal generation circuitry. It can be seen that the frequency of the pilot $\omega_{pilot}$ will change to compensate for the phase shift $\phi_0$, ensuring that the phase condition is met and an oscillation is present at some frequency. Note that the oscillation is generated initially from circuit noise and maintained by the regenerative effect of the positive feedback loop.

The pilot signal generation circuit contains one or more filters such as filters 404 and 416, a limiter 410, a phase shifter 412, and an absorptive switch 416. A detector and controller unit 408 is also needed to measure the residual pilot, which is an estimate of the Tx leakage along the RF coupled path not cancelled by the cancellation path. The detector and controller unit 408 may control the VM 345, the phase shifter 412, and the absorptive switch 414 through control lines 451, 452, and 453 respectively. The frequency response of the filters in the generator is selected typically to match that of the filter 335 in the cancellation circuit $H_1(\omega)$. If the filters are different, the filter in the generation circuit should have a narrower bandwidth that falls within the bandwidth of the filter 335 of the cancellation circuit.

The limiter 410 within the pilot signal generation circuit acts as an automatic level controller for the feedback loop. Excess loop gain from elsewhere in the feedback loop is removed by the clipping associated with the limiter 410.

The detector and controller unit 408 is used to measure the residual pilot signal. The VM 345 of the cancellation circuit path is adjusted by the detector and controller unit 408 based on the power level detected. The VM 345 is considered properly tuned when the detected power level is minimized.

Assuming that the VM 345 of the cancellation circuit is set to a zero magnitude (turned off), the nonlinear positive feedback will naturally find the frequency within the bandwidth of $H_1(\omega)$ that has the highest RF coupling, $\omega_{RF}$, amongst those frequencies that meet the phase condition. In order to find the maximum coupling within $H_1(\omega)$, the detector and controller unit 408 sends control signals to the phase shifter 412 within the pilot signal generation circuit to sweep the phase thus moving the pilot frequency over a small range. One may first perform a search, such as a descent-based search, of the phase shifter range to find the pilot frequency with the highest RF coupling using the detector and controller unit 408 to control the phase shifter 412. The cancellation circuit can then be tuned to find the VM 345 setting (gain and phase, or I and Q settings) that minimizes the detected pilot power. This can be performed using a two-dimensional descent-based search.

Detector and controller unit 408 must be located before the limiter 410 to measure the residual pilot signal. However, other components may be located in different places than shown in FIG. 4. For example, phase shifter 412 may be on either side of limiter 410. Also note that one of the filters in the pilot signal generation circuit, such as filters 404 or 416, can be removed if needed. The first filter 404 before the detector and controller unit 408 tends to reduce the variance of the measured pilot residual because some of the signals from mobiles present in the coverage area of the remote unit will be filtered and attenuated. The filter 416 after the limiter 410 is used to remove harmonics of the pilot frequency. Harmonics of the pilot can be problematic if they fall in the BTS's receive band, so it is preferred that they be attenuated using a filter. However, only one of the two filters is needed for the oscillation to be generated properly.

The pilot signal generation circuit is used typically as part of a calibration procedure. The pilot signal generation circuit is disabled using an absorptive switch 414 when the remote unit is operating as part of the DAS network. Absorptive switch 414 may be controlled by the detector and controller unit 408 through control line 453 or by an external signal controlling DAS remote unit. However, it is possible to calibrate a single remote unit while the remaining remote units within the DAS network are operating. In such cases, VVA 215 on the Tx path and VVA 240 on the Rx path of the remote unit being calibrated should be set to their maximum attenuation to avoid interfering with the network.

Several cancellation paths with disjoint frequency bandwidths can be included to perform Tx leakage cancellation for more bands. A pilot signal generation circuit is needed for each cancellation circuit. Two possible implementations are shown in FIG. 5 and FIG. 6.

Figure 5:
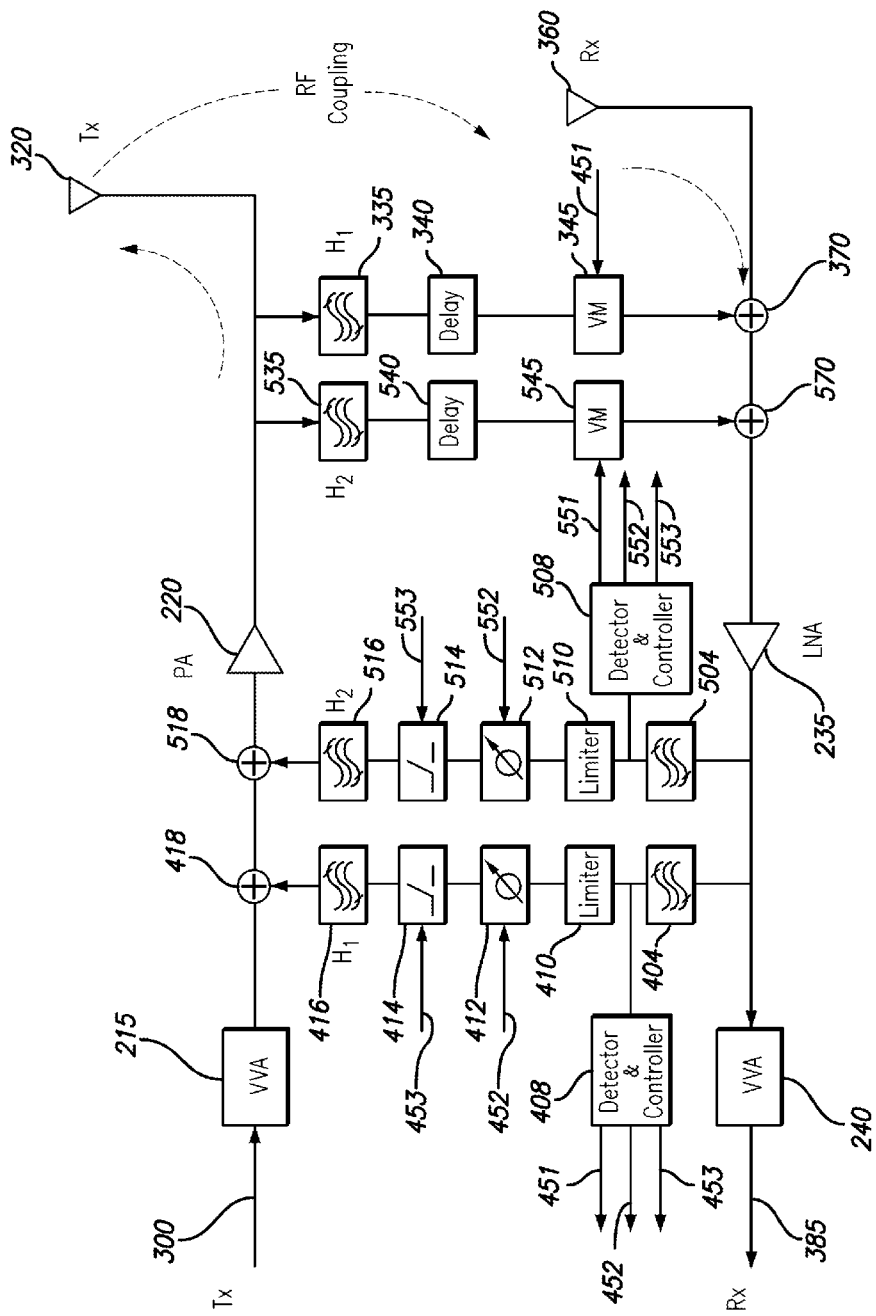
FIG. 5 is a schematic drawing of a remote unit for cancelling transmission leakage signals for two disjoint frequency bandwidths in an embodiment.

FIG. 5 illustrates a system having a second cancellation circuit and a second pilot signal generation circuit. The Tx signal path (i.e., the first signal path) comprises a VVA 215 which receives the transmission signal 300 from the output of an amplifier 210, additive couplers 418 and 518, a PA 220, and a Tx antenna 320. The Rx signal path (i.e., the second signal path) comprises an Rx antenna 360, additive couplers 370 and 570, a LNA 235, and a VVA 240 which generates a received signal 385 that is sent to the input of amplifier 245. The second cancellation circuit is coupled to the output of Tx PA 220 and comprises a bandpass filter 535, a delay circuit 540, and a VM 545 to generate a second cancellation signal. The second cancellation signal is fed to an input of the additive coupler 570 which adds the received signal with the second cancellation signal. The sum of the signals is amplified by Rx LNA 235. The second pilot signal generation circuit comprises a bandpass filter 504 coupled to the output of the LNA 235, a detector and controller unit 508, a limiter 510, a phase shifter 512, an absorptive switch 514, and a bandpass filter 516. The detector and controller unit 508 may control the VM 545, the phase shifter 512, and the absorptive switch 514 through control lines 551, 552, and 553 respectively. The output of the bandpass filter 516 is fed into additive coupler 518 which adds the pilot signal with the signal generated by VVA 215.

Figure 6:
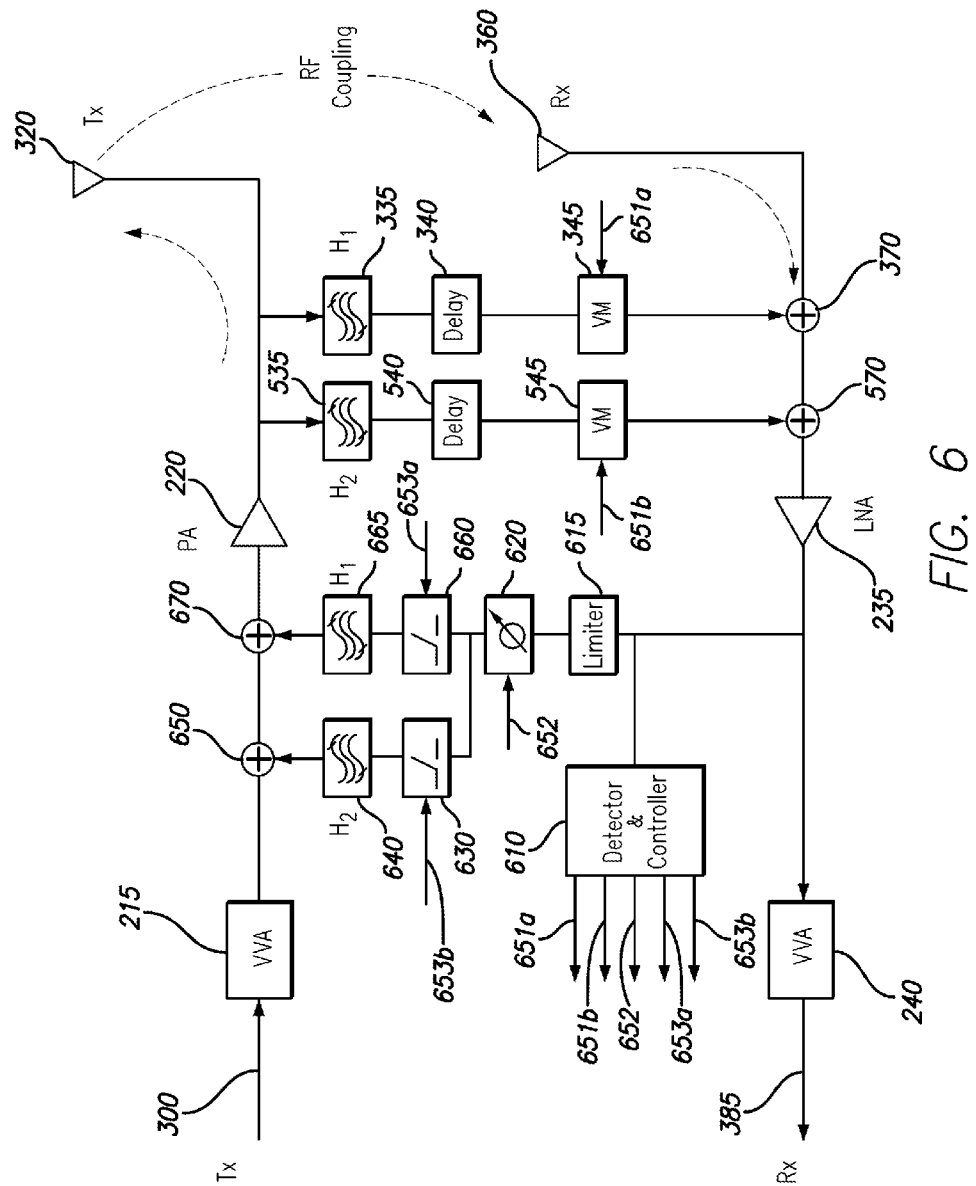
FIG. 6 is a schematic drawing of a remote unit for cancelling transmission leakage signals for two disjoint frequency bandwidths in another embodiment.

FIG. 6 illustrates a system having a second cancellation circuit and a modified pilot signal generation circuit. The Tx signal path (i.e., the first signal path) comprises a VVA 215 which receives the transmission signal 300 from the output of an amplifier 210, additive couplers 650 and 670, a PA 220, and a Tx antenna 320. The Rx signal path (i.e., the second signal path) comprises an Rx antenna 360, additive couplers 370 and 570, a LNA 235, and a VVA 240 which generates a received signal 385 that is sent to the input of amplifier 245. The modified pilot signal generation circuit comprises a detector and controller unit 610, limiter 615, and phase shifter 620. The output of the phase shifter 620 is fed into absorptive switch 630 and 660. The output of the absorptive switches 630 and 660 are fed into filters 640 and 665 respectively. The detector and controller unit 610 may control VMs 345 and 545, the phase shifter 620, and the absorptive switches 660 and 630 through control lines 651a, 651b, 652, 653a, and 653b respectively. The two pilot signals are coupled to additive couplers 650 and 670.

In both examples, two Tx leakage cancellation circuits are provided having frequency responses $H_1(\omega)$ and $H_2(\omega)$, which are assumed to be non-overlapping in frequency. In the first case, two pilot signal generation circuits are provided that have the same frequency responses as the cancellation circuits, $H_1(\omega)$ and $H_2(\omega)$. The two pilot signal generation circuits can be operated at the same time, assuming the PA 220 and LNA 235 are linear. In the second case, only one pilot signal generation circuit is used. However, the filter response is switched between $H_1(\omega)$ and $H_2(\omega)$ so that the most of the pilot signal generation circuitry is multiplexed. Note that the filter before the detector is removed.

The present invention has been described primarily as a system and method for cancelling transmission leakage signals in a wide bandwidth Distributed Antenna System ("DAS") having remote units. In this regard, the system and methods for cancelling transmission leakage signals are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A method for transmission leakage cancellation in a wireless remote unit in a distributed antenna system ("DAS"), the remote unit having a first signal path coupled to a transmission antenna and a second signal path coupled to a receiving antenna, comprising:
   generating a pilot signal;
   introducing the pilot signal in the first signal path;
   generating a cancellation signal;
   receiving a received signal having a transmission leakage signal at the receiving antenna;
   providing the received signal to the second signal path; and,
   cancelling the transmission leakage signal by adding the cancellation signal with the received signal over a bandwidth that is narrower than the bandwidth of the DAS,
   wherein an input to the cancellation signal is generated by adding the pilot signal and an output of a variable voltage attenuator.

2. The method as claimed in claim 1 further comprising the steps of:
   filtering the pilot signal with a bandpass filter having a first bandwidth; and,
   filtering the cancellation signal with a second bandpass filter having the first bandwidth.

3. The method as claimed in claim 1 wherein the step of cancelling the transmission leakage signal includes the steps of:

detecting a residual pilot signal after the cancellation signal has been added to the received signal; and, adjusting an amplitude and a phase of the cancellation signal based on the detected residual pilot signal.

4. The method as claimed in claim 3 further comprising the steps of:

shilling the frequency of the pilot signal to find a pilot frequency with a highest radio frequency coupling; and, adjusting the amplitude and phase of the cancellation signal to minimize the detected residual pilot signal.

5. The method as claimed in claim 4 wherein the step of adjusting the amplitude and the phase of the cancellation signal further includes the step of performing a two-dimensional descent-based search.

6. The method as claimed in claim 4 wherein adjusting the amplitude and the phase of the cancellation signal further includes the step of determining optimized amplitude and phase parameters.

\* \* \* \* \*